(12) United States Patent
Niu et al.

(10) Patent No.: US 10,737,399 B2
(45) Date of Patent: Aug. 11, 2020

(54) ROBOT

(71) Applicant: Seiko Epson Corporation, Tokyo (JP)

(72) Inventors: Akio Niu, Matsumoto (JP); Masaru Takahashi, Hamamatsu (JP); Takuya Owa, Shen Zhen (CN); Yoshinobu Goto, Matsumoto (JP)

(73) Assignee: Seiko Epson Corporation (JP)

(*) Notice: Subject to any disclaimer, the term of this patent is extended or adjusted under 35 U.S.C. 154(b) by 34 days.

(21) Appl. No.: 16/142,090

(22) Filed: Sep. 26, 2018

(65) Prior Publication Data

US 2019/0099900 A1 Apr. 4, 2019

(30) Foreign Application Priority Data

Sep. 29, 2017 (JP) ................. 2017-192200

(51) Int. Cl.
| | |
|---|---|
| B25J 17/00 | (2006.01) |
| B25J 17/02 | (2006.01) |
| B25J 18/00 | (2006.01) |
| B25J 19/00 | (2006.01) |
| B25J 9/12 | (2006.01) |
| H02K 5/22 | (2006.01) |
| H02K 11/33 | (2016.01) |
| H02K 5/10 | (2006.01) |

(52) U.S. Cl.
CPC .......... *B25J 19/0075* (2013.01); *B25J 9/126* (2013.01); *H02K 5/10* (2013.01); *H02K 5/225* (2013.01); *H02K 11/33* (2016.01); *H02K 2211/03* (2013.01)

(58) Field of Classification Search
CPC ............................ B25J 19/0075; B25J 9/0009
See application file for complete search history.

(56) References Cited

U.S. PATENT DOCUMENTS

| 6,408,710 B1 | 6/2002 | Kullborg et al. |
| 9,647,513 B2* | 5/2017 | Park ................. H02K 7/14 |
| 2017/0182669 A1* | 6/2017 | Bordegnoni ............. B25J 18/04 |

FOREIGN PATENT DOCUMENTS

| EP | 3124183 A1 | 2/2017 |
| EP | 3184261 A1 | 6/2017 |
| JP | 2002-239970 A | 8/2002 |
| JP | 2014-240099 A | 12/2014 |

OTHER PUBLICATIONS

Extended European Search Report for Patent Application No. EP18197156.5 dated Mar. 29, 2019 (9 pages).

* cited by examiner

*Primary Examiner* — Jake Cook
(74) *Attorney, Agent, or Firm* — Harness, Dickey & Pierce, P.L.C.

(57) ABSTRACT

A robot includes a robot main body that includes a base including a first casing and a robot arm connected to the base and including a second casing, a motor that is provided inside the second casing and drives the robot arm, a control board that is provided inside the first casing, a power supply board that is provided inside the first casing and supplies electric power to the control board, and a drive board that drives the motor based on a command from the control board, and in which the first casing is constituted with a plurality of members, a first sealing member is provided between the plurality of members of the first casing, and the second casing is constituted with a plurality of members, and a second sealing member is provided between the plurality of members of the second casing.

6 Claims, 12 Drawing Sheets

ROBOT

BACKGROUND

1. Technical Field

The present invention relates to a robot.

2. Related Art

In the related art, an industrial robot that performs various work on a work target instead of a human being is active. As an example of such an industrial robot, for example, a robot including a base, a robot arm provided so as to be rotatable with respect to the base, and a motor provided inside the robot arm and driving the robot arm is known. In general, a controller provided separately from the robot is connected to such a robot. The robot arm is driven by driving the motor with the controller. With this configuration, the robot can perform various work on the work target.

In recent years, a robot capable of working under an environment requiring waterproof performance or dustproof performance is developed. For example, JP-A-2002-239970 discloses a robot in which a packing for sealing is interposed between a housing and a cover that constitute a robot arm so as to exhibit waterproof performance.

However, in the related art, a robot equipped with an arm and having waterproof performance or the like is known, but a controller having waterproof performance equivalent to that of the robot and the like is not known. For that reason, in a case where the robot is disposed under an environment requiring waterproof performance and the like, measures such as putting the controller in a separate environment or putting the controller in a protective box so that waterproof performance equivalent to that of the robot can be obtained was necessary. Accordingly, and there is a problem that a worker has to design how to dispose the robot and the controller, respectively, that a protective box for the controller has to be prepared. This is a great deal of trouble for the worker.

SUMMARY

An advantage of some aspects of the invention is to solve at least a part of the problems described above, and the invention can be implemented as the following configurations.

A robot according to an application example includes a robot main body that includes a base including a first casing and a robot arm connected to the base and including a second casing, a drive unit that is provided inside the robot main body and drives the robot arm, a control board that is provided inside the robot main body, a power supply board that supplies electric power to the control board, and a drive board that drives the drive unit based on a command from the control board, and in which the first casing is constituted with a plurality of members, a first sealing member is provided between the plurality of members of the first casing, the second housing is constituted with a plurality of members, and a second sealing member is provided between the plurality of members of the second casing.

According to such a robot, it is possible to realize a robot in which the control board having a function as a controller and the power supply board, the drive board, and the robot main body are integrated. For that reason, it is unnecessary to consider each disposition of the controller and the robot main body as in the related art. In addition, since an internal space for accommodating the control board, the power supply board, and the drive board is sealed, the robot of this application example may be used under an environment requiring waterproof performance or dustproof performance.

In the robot according to the application example, it is preferable that the robot main body is provided with an external connection portion to which an external wiring is connected, and at least a portion of the external connection portion is provided so as to be exposed to the outside of the robot main body and has a waterproof property and dustproof property.

With this configuration, the robot may be suitably driven under an environment requiring waterproof performance and the like.

In the robot according to the application example, it is preferable that a connection portion that is disposed inside the robot main body, is detachable from the external connection portion, and electrically connects the external connection portion and the power supply board is provided, and the connection portion may be disposed in a state of being removed from the external connection portion and exposed to the outside of the robot main body, and the external wiring is connected instead of the external connection portion.

With this configuration, for example, it is possible to easily change a robot that requires waterproof performance and the like to a robot that does not require waterproof performance and the like. Also, the reverse is true. For that reason, a robot according to environmental conditions may be provided.

In the robot according to the application example, it is preferable that the control board is provided inside the base.

With this configuration, it is easy to design the layout of various wirings connecting the control board and other portions (for example, drive board). In the sealed robot, it is possible to repair the control board or the like by releasing only the sealing of the base without releasing all the sealing of the robot arm and the base, for example, and thus, convenience is high.

In the robot according to the application example, it is preferable that the power supply board is provided in the base.

With this configuration, it is easy to design the layout of the various wirings connecting the power supply board and the other portion (for example, drive board). In the sealed robot, it is possible to repair the power supply board or the like by releasing only the sealing of the base without releasing all the sealing of the robot arm and the base, for example, and thus, convenience is high.

In the robot according to the application example, it is preferable that the robot arm includes a first arm that is rotatably connected to the base and a first drive unit that drives the first arm is provided in the first arm.

With this configuration, for example, in a case where the control board or the like is provided in the base, the first drive unit may be kept away from the control board or the like as compared with a configuration in which the first drive unit is disposed in the base. For that reason, thermal runaway caused by heat generated from the first drive unit and heat generated from the control board may be reduced and thus, the robot may be stably driven for a long time under an environment requiring dustproof performance or waterproof performance.

In the robot according to the application example, it is preferable that the robot arm includes a second arm that is rotatably connected to the first arm, and a second drive unit that drives the second arm is provided in the second arm.

With this configuration, heat generated from the first drive unit and the second drive unit may be eliminated more efficiently and thus, the robot may be stably driven for a long time under an environment requiring waterproof performance or the like.

In the robot according to the application example, it is preferable that a first drive board that drives the first drive unit is provided in the first arm, and a second drive unit that drives the second drive unit is provided in the second arm.

With this configuration, the connection between the first drive board and the first drive unit and connection between the second drive board and the second drive unit may be made in a simple configuration. Further, heat generated from the first drive board and the second drive board may be eliminated more efficiently and thus, the robot may be stably driven for a long time under an environment requiring dustproof performance or waterproof performance.

In the robot according to the application example, it is preferable that the robot arm includes an A-arm and a B-arm cantilevered by the A-arm.

With this configuration, it is possible to reduce installation places of the sealing member as compared with the case where the B-arm is supported at both ends. For that reason, sealing performance of the robot main body may be enhanced.

In the robot according to the application example, it is preferable that a fan is not provided in the robot main body.

With this configuration, a robot having excellent sealing performance may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot according to the invention will be described in detail based on preferred embodiments illustrated in the accompanying drawings.

Basic Configuration of Robot

Figure 1:
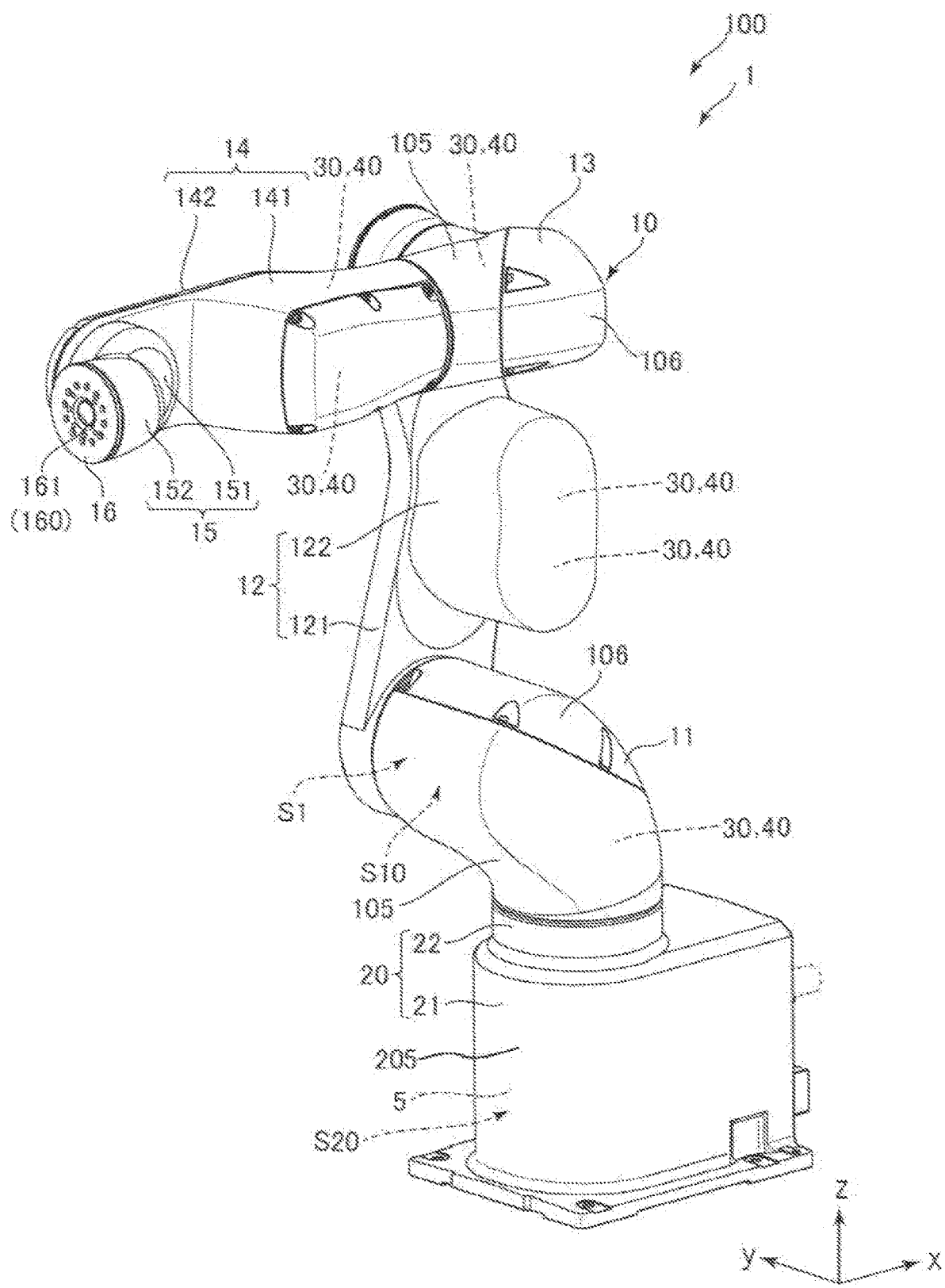
FIG. 1 is a perspective view illustrating a robot according to an embodiment.
Figure 2:
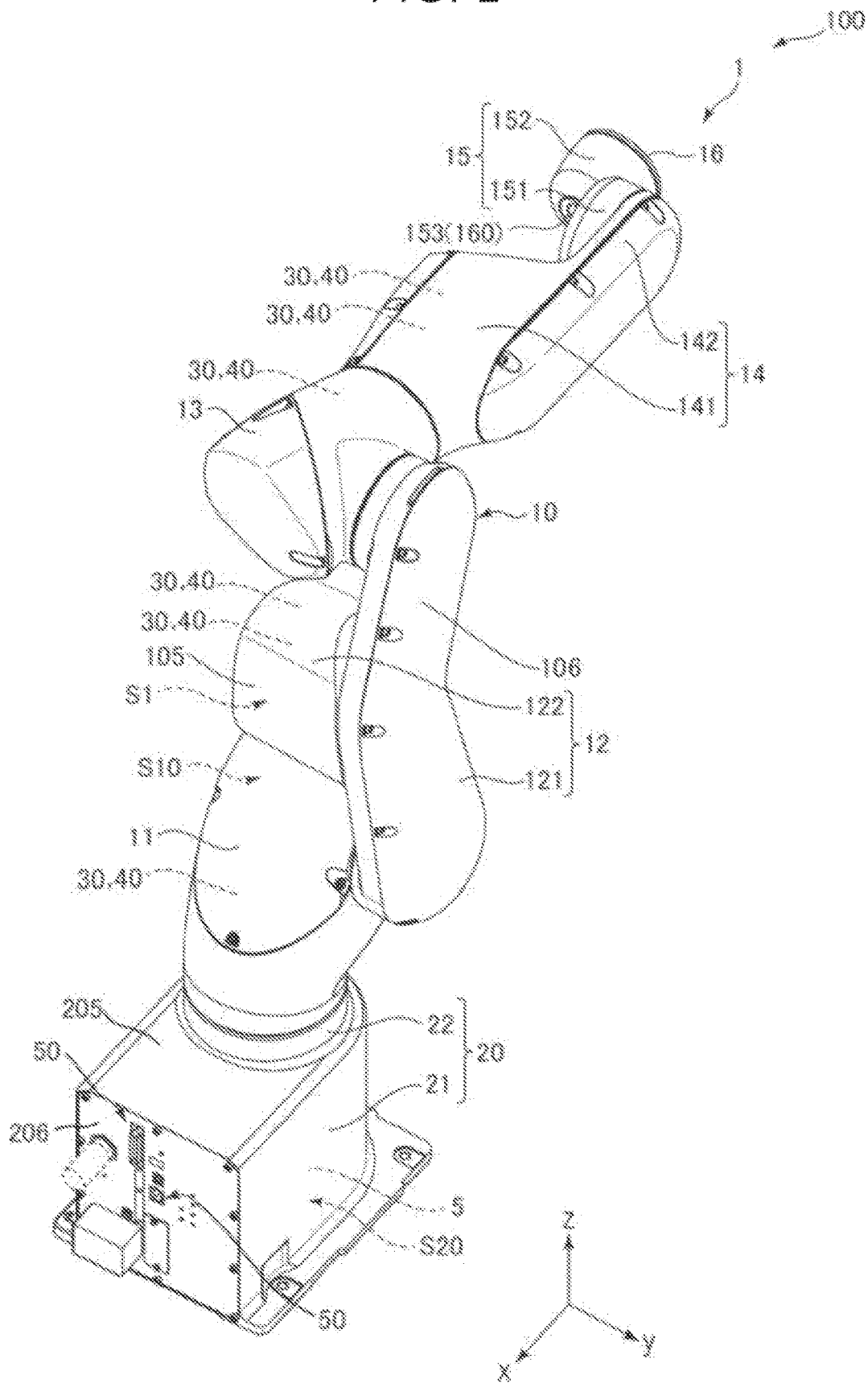
FIG. 2 is a perspective view of the robot illustrated in FIG. 1 as viewed from a direction different from that in FIG. 1.
Figure 3:
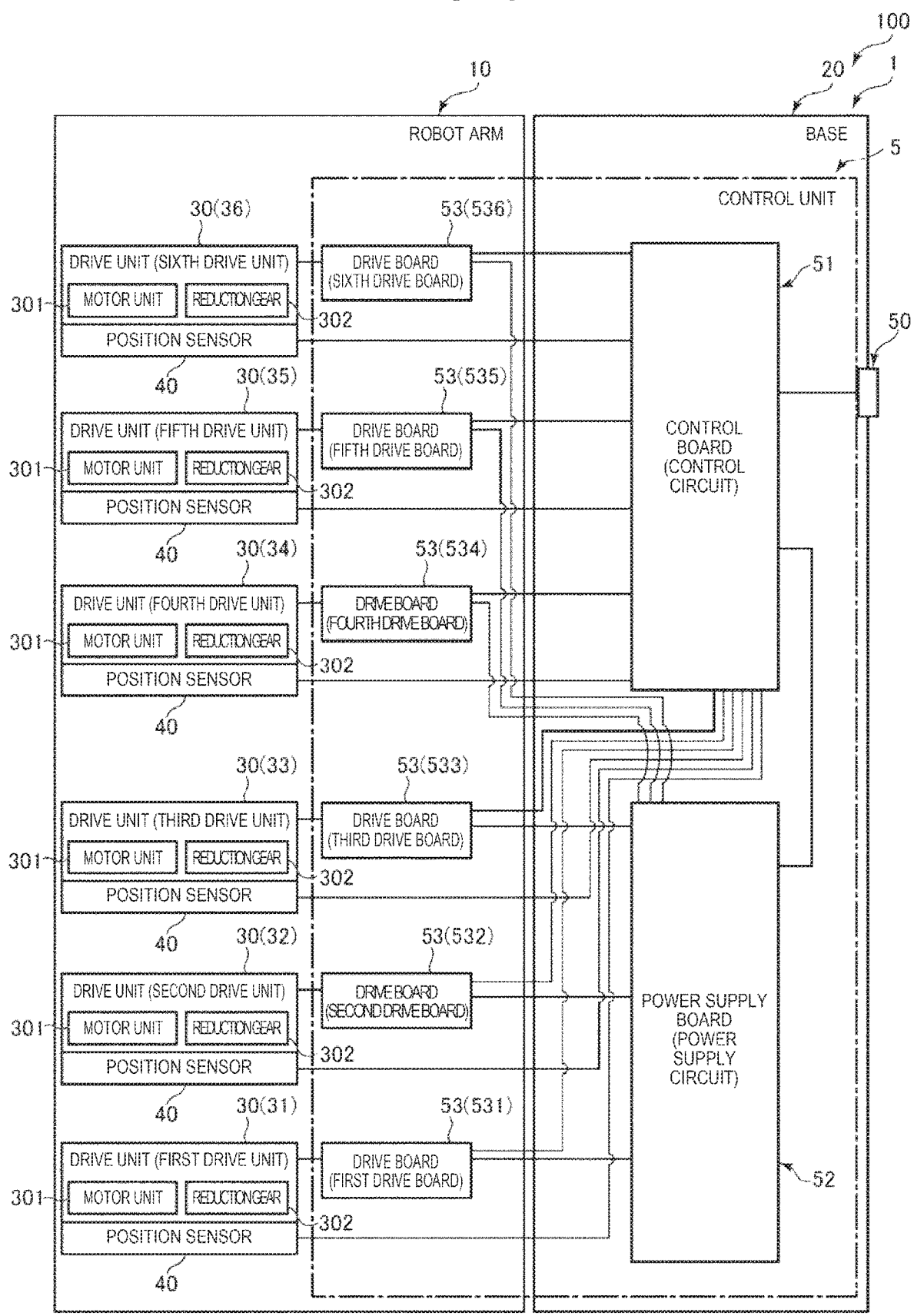
FIG. 3 is a system block diagram of the robot illustrated in FIG. 1.
Figure 4:
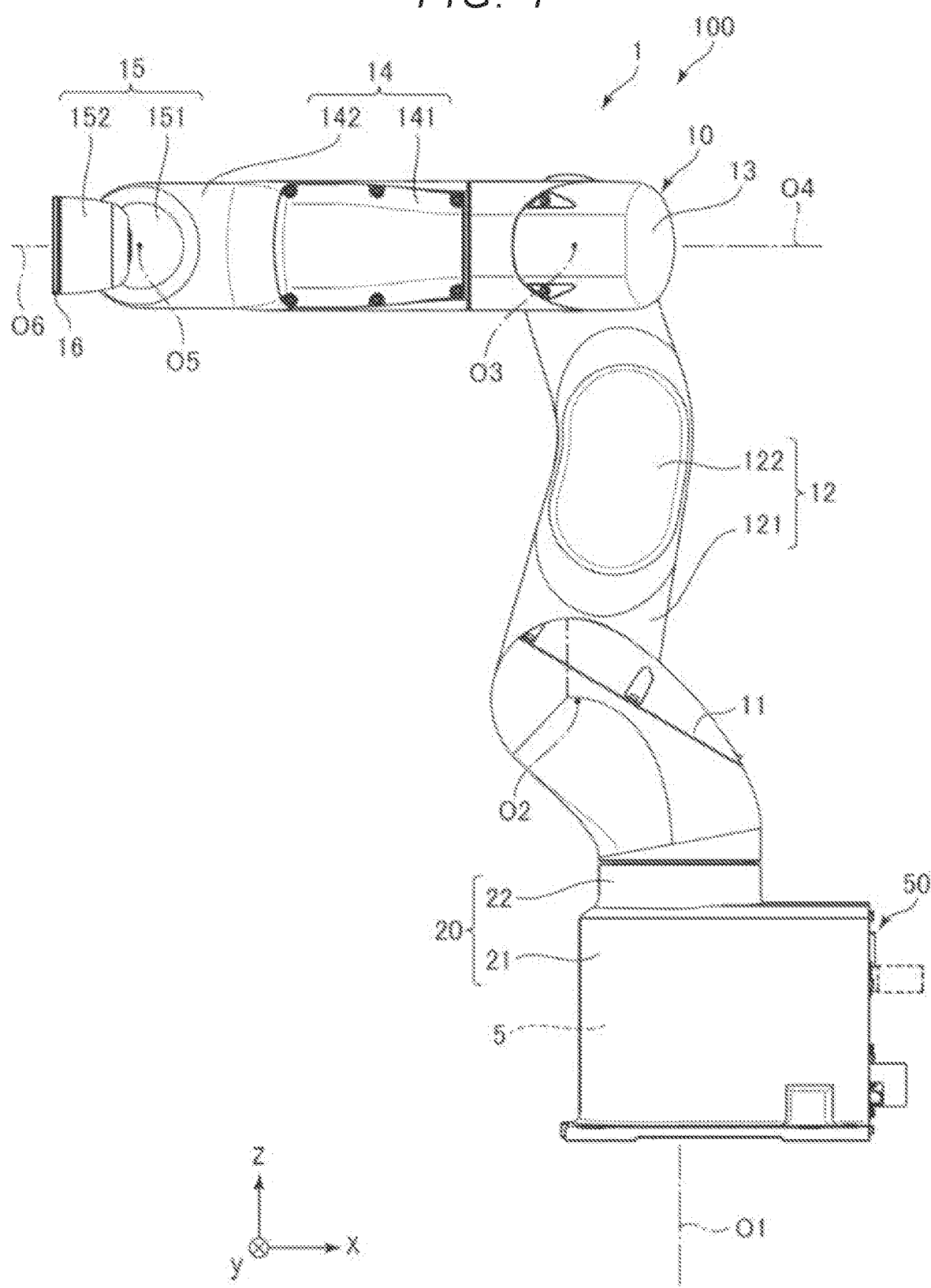
FIG. 4 is a diagram of the robot illustrated in FIG. 1 as viewed from the −y axis side.
Figure 5:
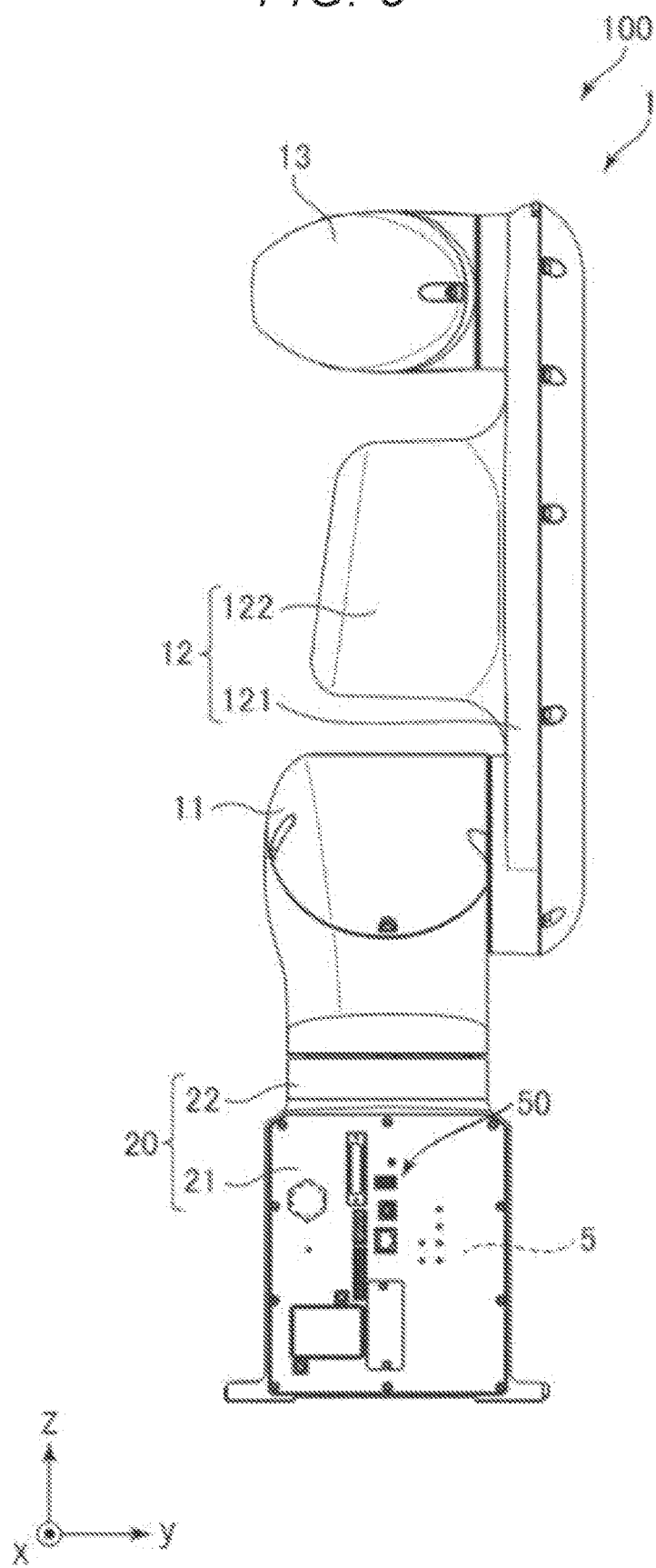
FIG. 5 is a diagram of the robot illustrated in FIG. 1 as viewed from the +x axis side.
Figure 6:
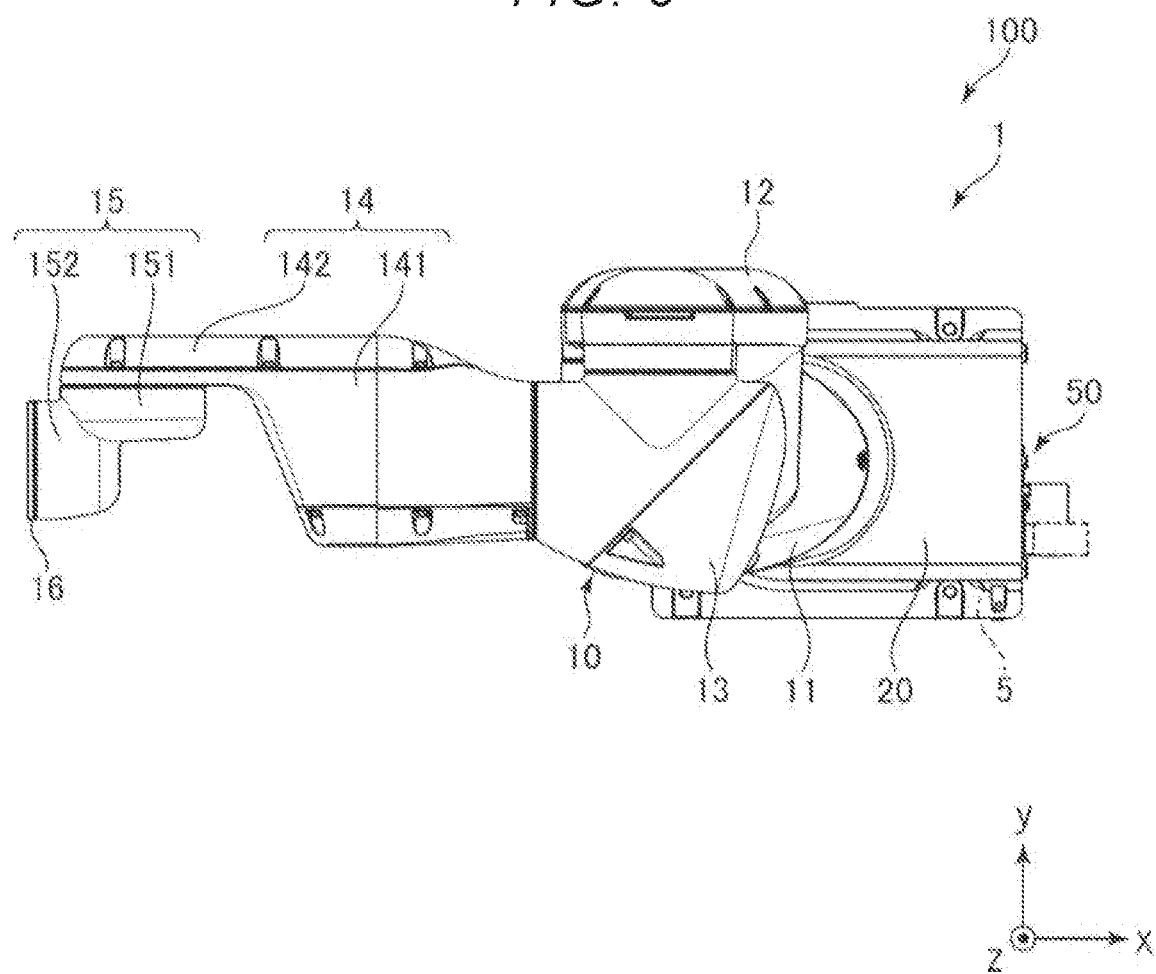
FIG. 6 is a diagram of the robot illustrated in FIG. 1 as viewed from the +z axis side.
Figure 7:
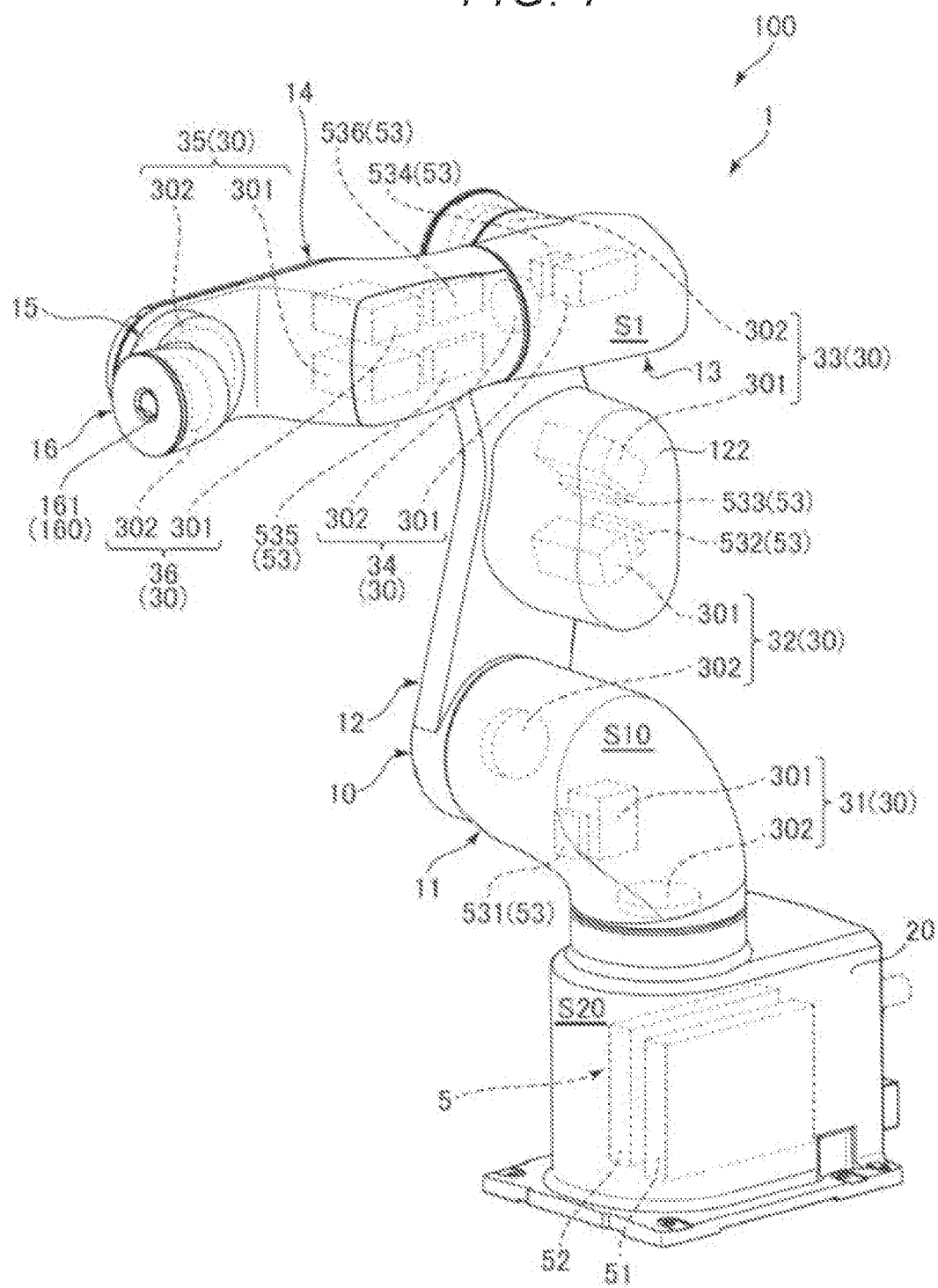
FIG. 7 is a perspective view schematically illustrating the inside of a robot main body included in the robot illustrated in FIG. 1.

FIG. 1 is a perspective view illustrating a robot according to an embodiment. FIG. 2 is a perspective view of the robot illustrated in FIG. 1 as viewed from a direction different from that in FIG. 1. FIG. 3 is a system block diagram of the robot illustrated in FIG. 1. FIG. 4 is a diagram of the robot illustrated in FIG. 1 as viewed from the −y axis side. FIG. 5 is a diagram of the robot illustrated in FIG. 1 as viewed from the +x axis side. FIG. 6 is a diagram of the robot illustrated in FIG. 1 as viewed from the +z axis side. FIG. 7 is a perspective view schematically illustrating the inside of a robot main body included in the robot illustrated in FIG. 1. For convenience of explanation, in each of FIGS. 1, 2, and 4 to 7, x, y, and z axes are illustrated as three axes orthogonal to each other, and the tip end side of the arrow indicating each axis is defined as "+", and the base end side thereof is defined as "−". Also, a direction parallel to the x axis is referred to as the "x axis direction", a direction parallel to the y axis is referred to as the "y axis direction", and a direction parallel to the z axis is referred to as "z axis direction". The base 20 side of a robot 100 illustrated in FIG. 1 is referred to as a "base end", and the opposite side (arm 16 side) is referred to as a "tip end". The upper side in FIG. 4 is referred to as "upper" and the lower side is referred to as "lower". Further, the up-and-down direction in FIG. 4 is defined as the "vertical direction", and the right-and-left direction is defined as the "horizontal direction".

Also, in this specification, the term "horizontal" includes a case where it is inclined within a range of ±5 degrees or less with respect to the horizontal. Similarly, the term "vertical" includes a case where it is inclined within a range of ±5 degrees or less with respect to the vertical. Also, the term "parallel" includes not only a case where two lines (including axes) or planes are perfectly parallel to each other but also a case where two lines (including axes) or planes are inclined within ±5 degrees. The term "orthogonal" includes not only a case where two lines (including axes) or planes intersect each other at an angle of 90 degrees but also a case where it is inclined within ±5 degrees with respect to 90 degrees.

The robot 100 illustrated in FIGS. 1 and 2 is a so-called six axis vertical articulated robot. The robot 100 can be used, for example, in a manufacturing process for manufacturing precision instruments such as wristwatches. In particular, the robot 100 has waterproof performance and dustproof performance. For that reason, the robot 100 can be used under an environment requiring waterproof performance or under an environment requiring dustproof performance (for example, a clean room or the like).

In the following, the basic configuration of the robot 100 will be described.

The robot 100 includes a robot main body 1, a plurality of drive units 30, a position sensor 40, and a control unit 5 (control device) built in the robot main body 1 (see FIGS. 1 to 3). The robot 100 includes a plurality of external connection portions 50 (for example, connectors, and the like). Electric power is supplied to the robot 100 by electrically connecting the external connection portion 50 (a first connector) to an external power supply (not illustrated) such as a commercial power supply. With this configuration, the robot 100 can be driven.

In this specification, the orientation of the robot 100 illustrated in FIG. 1 (the same orientation in FIGS. 2 and 4 to 7) is referred to as "basic orientation". In addition, for convenience of explanation, unless otherwise mentioned, in the description on a disposition relationship of the respective portions of the robot 100, description will be made based on the robot 100 in a state of being stationary in the basic orientation.

Robot Main Body

As illustrated in FIGS. 1 and 2, the robot main body 1 includes a base 20 and a robot arm 10 connected to the base 20. As will be described later in detail, the robot main body 1 is configured to include a plurality of exterior members (plurality of housings 105 and 205 and a plurality of covers 106 and 206, and the like), and includes an internal space S1 accommodating a plurality of drive units 30, a plurality of position sensors 40 and the control unit 5. The internal space S1 includes the inside of the base 20, that is, an internal space S20 and the inside of the robot arm 10, that is, an internal space S10, and the internal space S10 and the internal space S20 communicate with each other.

In the following, respective portions of the robot main body 1 will be described below.

Base

The base 20 is a portion for attaching the robot 100 to any installation place. The installation place of the base 20 is not particularly limited, and may be, for example, a floor, a wall, a ceiling, a work stand, a movable carriage, and the like. The base 20 includes a main body 21 having a rectangular parallelepiped outer shape and a protruding port ion 22 provided on the +z axis side of the main body 21 and having a columnar outer shape.

Robot Arm

The robot arm 10 is rotatably supported on the base 20, and includes an arm 11 (first arm), an arm 12 (second arm), an arm 13 (third arm), an arm 14 (fourth arm), an arm 15 (fifth arm), and an arm 16 (sixth arm, tip end arm). These arms 11 to 16 are connected in this order from the base end side to the tip end side, and are configured so as to be rotatable relative to the adjacent base end side arm or base 20. Although not illustrated in detail, in the embodiment, each of the arms 11 to 16 is provided with an exterior member (housing 105, cover 106, and the like), and a support member (not illustrated) provided on the inner peripheral surface of the exterior member and including a bearing (not illustrated) connected to the drive unit 30.

As illustrated in FIG. 4, the arm 11 is connected to the protruding portion 22 of the base 20, and is rotatable around the rotational axis O1 along the vertical direction with respect to the base 20. The arm 11 has a shape extending obliquely upward from the base 20 and the tip end portion of the arm 11 protrudes outward from the base 20 as viewed from the z axis direction.

As illustrated in FIGS. 4 and 5, the arm 12 is connected to a portion on the +y axis side of the tip end portion of the arm 11, and is rotatably movable with respect to the arm 11 around a rotation axis O2 along a horizontal direction. The arm 12 has a longitudinal shape in which the central portion is bent as viewed from the y axis direction, and includes a flat portion 121 having a shape extending from the arm 11 toward the arm 13 and a protruding portion 122 protruding from the central portion of the flat portion 121 toward the −y axis direction. The protruding portion 122 is separated from the arm 11 so as not to contact the arm 11 even when the arm 12 rotates.

As illustrated in FIGS. 4, 5, and 6, the arm 13 is connected to a surface (portion) on the same −y axis side as the surface of the flat portion 121 on which the arm 11 is provided and is rotatable around a rotation axis O3 along the horizontal direction with respect to the arm 12. The arm 13 has a shape protruding from the arm 12 in the −y axis direction. In addition, the arm 13 is connected to the arm 12 so as not to contact the protruding portion 122.

As illustrated in FIG. 4, the arm 14 is connected to the tip end portion of the arm 13 and is rotatable around a rotation axis O4 orthogonal to the rotation axis O3 with respect to the arm 13. As illustrated in FIG. 6, the arm 14 has a shape extending in the −x axis direction from the arm 13, and the length (width) of the arm 14 in the y axis direction gradually decreases in the +y axis direction (one side in the width direction of the arm 14) while orienting from the base end side to the tip end side in the middle. Such an arm 14 includes a base end side portion 141 and a tip end side portion 142 whose length in the y axis direction is shorter than that of the base end side portion 141.

As illustrated in FIG. 4, the arm 15 is connected to the −y axis side portion of the tip end portion 142, and is rotatable around the rotation axis O5 orthogonal to the rotation axis O4 with respect to the arm 14. As illustrated in FIGS. 4 and 6, the arm 15 includes a first portion 151 protruding from the tip end portion of the arm 14 in the −y axis direction and a second portion 152 connected to the first portion 151. The outer shape of the first portion 151 is a columnar shape. On the other hand, the outer shape of the second portion 152 is cylindrical and has a hole 153 penetrating along the x axis direction (see FIG. 2). As illustrated in FIG. 6, the portion on the +y axis side of the center line of the second portion 152 is connected to the base end portion of the first portion 151. In the embodiment, the first portion 151 and the second portion 152 are integrally formed.

As illustrated in FIG. 4, the arm 16 is connected to the base end portion of the arm 15, and is rotatable around the rotation axis O6 orthogonal to the rotation axis O5 with respect to the arm 15. The arm 16 is in the shape of a disk and includes a hole 161 penetrating along the x axis direction in the center portion thereof (see FIG. 1). The hole 161 communicates with the hole 153 of the second portion 152 of the arm 15, and the hole 161 and the hole 153 constitute a through-hole 160 (see FIGS. 1 and 2). Although not illustrated, such an arm 16 is configured so as to be able to allow attachment of an end effector for performing various work such as gripping, for example, on a work target. In this case, wiring (not illustrated) for transmitting the driving force to the end effector can be inserted through the through-hole 160. For example, the arm 16 may be configured so that a force detection device (force sensor), although not illustrated, for detecting a force (including moment) applied to the end effector can be attached. In this case, it is preferable to provide the force detection device between the end effector and the arm 16.

As described above, the robot 100 including the robot main body 1 having such a configuration is a vertical articulated robot including six (plural) arms 11 to 16. That is, the robot 100 has six rotation axes O1 to O6, and is a robot with six degrees of freedom. For that reason, the driving range of the tip end portion of the robot arm 10 is wide, so that high workability can be exhibited. In the embodiment, the number of arms included in the robot 100 is six, but the number of arms may be one to five, or may be seven or more. However, in order to precisely position the end effector provided at the tip end of the robot arm 10 at the intended place in the three-dimensional space, it is preferable that the number of arms (number of rotation axes) is at least six.

As described above, the arm 12 is connected to a portion on the +y axis side of the tip end portion of the arm 11. As such, the arm 12 is not configured to be supported at both ends as sandwiched by the arm 11, but is cantilevered by the arm 11. That is, the robot arm 10 includes the arm 11 (A-arm) and the arm 12 (B-arm) is cantilevered by the arm 11 (A-arm).

With this configuration, as compared with a case where the arm 12 is supported at both ends by the arm 11, the configuration of the arms 11, 12 can be simplified and the cost can be reduced.

Furthermore, as described above, the arm 15 is connected to a portion on the −y axis side of the tip end side portion 142. As such, the arm 15 is not configured to be supported at both ends by the arm 14, but is cantilevered by the arm 14. That is, the robot arm 10 includes the arm 14 (A-arm) and the arm 15 (B-arm) is cantilevered by the arm 14 (A-arm).

With this configuration, as compared with the case where the arm 15 is supported at both ends by the arm 14, the configuration of the arms 14, 15 can be simplified and the cost can be reduced.

As described above, in the embodiment, there are a plurality (two) of "B-arms" supported in a cantilever manner. For that reason, the configuration of the robot arm 10 can be simplified, and the cost can be greatly reduced.

In the embodiment, the volume of the inside of the base 20 is equal to or smaller than the volume of the robot arm 10. For that reason, the degree of freedom of installation of the base 20 can be increased.

Drive Unit

As illustrated in FIG. 3, the robot 100 includes the same number (six in the embodiment) of drive units 30 as the arms 11 to 16. Each of the plurality of drive units 30 has a function of rotating the corresponding arm with respect to the arm (or base 20) positioned on the base end side thereof, and includes a motor unit 301 including a motor as a power supply and a brake, a power transmission mechanism (not illustrated) including a reduction gear 302, a belt (not illustrated), a pulley (not illustrated), and the like.

In the embodiment, one drive unit 30 is responsible for driving one arm. Accordingly, the robot 100 includes a first drive unit 31 for driving the arm 11, a second drive unit 32 for driving the arm 12, a third drive unit 33 for driving the arm 13, a fourth drive unit 34 for driving the arm 14, a fifth drive unit 35 for driving the arm 15, and a sixth drive unit 36 for driving the arm 16. In the following description, when the first drive unit 31, the second drive unit 32, the third drive unit 33, the fourth drive unit 34, the fifth drive unit 35, and the sixth drive unit 36 are not distinguished from each other, these drive units are respectively referred to as the drive unit 30.

As illustrated in FIG. 7, each of the motor unit 301 and the reduction gear 302 included in the first drive unit 31 is provided in the arm 11. Although not illustrated in detail, the first drive unit 31 includes a first pulley (not illustrated) connected to the shaft portion of the motor unit 301, a second pulley (not illustrated) disposed to be spaced apart from the first pulley and connected to the shaft portion of the reduction gear 302, and a belt (not illustrated) wound around the first pulley and the second pulley. The second pulley is connected to a bearing (not illustrated) included in the arm 11. With this configuration, the arm 11 is rotatable by being driven by the first drive unit 31. Matters substantially the same as those described above of the are applied to the second drive unit 32, the third drive unit 33, the fourth drive unit 34, the fifth drive unit 35, and the sixth drive unit 36, which will be described later, and the corresponding arm is driven through so-called belt drive.

As illustrated in FIG. 7, the motor unit 301 included in the second drive unit 32 is provided in the protruding portion 122, and the reduction gear 302 of the second drive unit 32 is provided at a connection portion between the arm 12 and the arm 11 (joint portion). The motor unit 301 included in the third drive unit 33 is provided in the protruding portion 122, and the reduction gear 302 included in the third drive unit 33 is provided at a connection portion (joint portion) between the arm 12 and the arm 13. Each of the motor unit 301 and the reduction gear 302 included in the fourth drive unit 34 is provided in the arm 13. The motor unit 301 included in the fifth drive unit 35 is provided in the base end side portion 141 on the base end side of the arm 14 and the reduction gear 302 included in the fifth drive unit 35 is provided in the first portion 151 of the arm 15. The motor unit 301 included in the sixth drive unit 36 is provided in the base end side portion 141 on the base end side of the arm 14 and the reduction gear 302 included in the sixth drive unit 36 is provided in the second portion 152 of the arm 15 (see FIG. 7). Although not illustrated, the sixth drive unit 36 includes a conversion mechanism for converting the transmission direction of the driving force of a bevel gear or the like by 90 degrees.

Position Sensor

As illustrated in FIG. 3, the robot 100 includes the same number of position sensors 40 as that of the drive units 30, and one position sensor 40 (angle sensor) is provided for one drive unit 30. The position sensor 40 detects a rotation angle of the rotation shaft (shaft portion) of the motor unit 301 (specifically, the motor) or the reduction gear 302. With this configuration, it is possible to obtain information such as an angle (orientation) of the arm on the tip end side with respect to the arm on the base end side. As each of these position sensors 40, for example, a rotary encoder or the like can be used. Each position sensor 40 is electrically connected to a control board 51 of the control unit 5 to be described later.

Control Unit

As illustrated in FIG. 3, the control unit 5 includes the control board 51, a power supply board 52 for supplying power to the control board 51, a plurality of drive boards 53 for driving the respective drive units 30 based on a command from the control board 51. The control board 51 and the power supply board 52 constitute a control device (controller) that supplies power for driving the robot 100 and controls driving of the robot 100.

Control Board

As illustrated in FIG. 7, the control board 51 is provided in internal space S20 and includes a control circuit (not illustrated) for controlling driving of the robot 100. The control circuit includes a processor such as a central processing unit (CPU), a volatile memory such as a random access memory (RAM), a nonvolatile memory such as a read only memory (ROM), and the like, and performs control of driving of each portion of the robot 100 and processing such as various operations and determinations. For example, the control circuit is capable of executing a predetermined control program, and outputs a control signal to each drive board 53 according to the control program so as to cause the robot 100 (specifically, the robot arm 10) to execute a predetermined operation.

Power Supply Board

As illustrated in FIG. 7, the power supply board 52 is provided in the internal space S20, and includes a power supply circuit (not illustrated) for generating electric power to be supplied to the control board 51 and each drive board 53. The power supply circuit includes a transformer and a noise filter, converts the frequency and voltage of power supplied from an external power supply (not illustrated) such as a commercial power supply, and supplies the converted frequency and voltage to the control board 51 and each drive board 53. In particular, in the embodiment, the power supply circuit is provided with a converter for converting an AC voltage output from the external power supply into a DC voltage (drive voltage) of 52 V and outputting the DC voltage (drive voltage) to each drive board 53 or the like.

Drive Board

As illustrated in FIG. 7, each of the drive boards 53 is distributed and disposed in the internal space S10, and includes a drive circuit (not illustrated) that receives a control signal from the control board 51 and converts (generates) power into electric power to be supplied to the drive unit 30. The drive circuit includes, for example, an inverter circuit that converts DC power (current) to AC power (current).

In the embodiment, one drive board 53 is provided for one drive unit 30, and the drive board 53 corresponding to each drive unit 30 performs conversion (generation) of electric power to be supplied to the drive unit 30. Accordingly, the robot 100 includes a first drive board 531 corresponding to the first drive unit 31, a second drive board 532 corresponding to the second drive unit 32, a third drive board 533 corresponding to the third drive unit 33, a fourth drive board 534 corresponding to the fourth drive unit 34, a fifth drive board 535 corresponding to the fifth drive unit 35, and a sixth drive board 536 corresponding to the sixth drive unit 36. In the following description, in a case where the first drive board 531, the second drive board 532, the third drive board 533, the fourth drive board 534, the fifth drive board 535, and the sixth drive board 536 are not distinguished from each other, these boards are respectively referred to as the drive board 53.

As illustrated in FIG. 7, the first drive board 531 is provided in the arm 11, and is provided in the vicinity of the motor unit 301 included in the first drive unit 31. The second drive board 532 is provided in the protruding portion 122 of the arm 12 and is provided in the vicinity of the motor unit 301 included in the second drive unit 32. The third drive board 533 is provided in the protruding portion 122 of the arm 12 and is provided in the vicinity of the motor unit 301 included in the third drive unit 33. The fourth drive board 534 is provided in the arm 13 and is provided in the vicinity of the motor unit 301 included in the fourth drive unit 34. The fifth drive board 535 is provided in the arm 14 and is provided in the vicinity of the motor unit 301 included in the fifth drive unit 35. The sixth drive board 536 is provided in the arm 14 and is provided in the vicinity of the motor unit 301 included in the sixth drive unit 36.

The basic configuration of the robot 100 has been described as above.

As described above, in the robot 100, the plurality of drive units 30 and the control unit 5 having the function of the controller are accommodated inside the robot main body 1, that is, in the internal space S1. That is, the drive unit 30 (a plurality of in the embodiment) that drives the robot arm 10, the control board 51, the power supply board 52 that supplies power to the control board 51, and a drive board 53 (a plurality of in the embodiment) that drives the drive unit 30 based on a commands from the control board 51 are disposed in the internal space S1. For that reason, it is unnecessary to separately consider the disposition of the controller as in the related art, and the degree of freedom of disposition of the robot 100 can be increased. Further, as compared with the case where the controller is a separate body, it is possible to reduce the total installation area and to save time and effort such as connection to the controller.

As described above, the control board 51 is provided in the base 20.

With this configuration, it is easy to design the disposition of various wirings (not illustrated) for connecting the control board 51 and each drive board 53.

Furthermore, as described above, the power supply board 52 is provided in the base 20.

With this configuration, it is easy to design the disposition of various wirings (not illustrated) for connecting the power supply board 52 and each drive board 53.

As compared with the case where the control board 51 and the power supply board 52 are provided in the robot arm 10, the control board 51 and the power supply board 52 can be stably disposed, and it is also possible to prevent an increase in load capacity of the tip end portion of the robot arm 10.

As described above, the robot arm 10 includes the arm 11 (first arm) rotatably connected to the base 20, and the first drive unit 31 for driving the arm 11 is provided in the arm 11.

With this configuration, the first drive unit 31 can be moved away from the control board 51 and the like provided in the base 20, as compared with the configuration in which the first drive unit 31 is disposed in the base 20. For that reason, it is possible to reduce thermal runaway caused by heat generated from the first drive unit 31 and heat generated from the control board 51 and the like, so that the robot 100 can be stably driven for a long time.

Furthermore, as described above, the robot arm 10 includes the arm 12 (second arm) rotatably connected to the arm 11 (first arm), and the second drive unit 32 for driving the arm 12 is provided in the arm 12.

With this configuration, heat generated from the first drive unit 31 and the second drive unit 32 can be eliminated more efficiently.

As described above, the robot arm 10 includes the plurality of arms 11 to 16 connected to each other, and the plurality of drive units 30 for independently driving the plurality of arms 11 to 16 are provided inside the robot arm 10. Then, the plurality of drive units 30 are dispersedly provided in the robot arm 10 (see FIG. 7).

With this configuration, since it is possible to disperse heat generated from the drive unit 30, thermal runaway can be reduced, and thus the robot 100 can be stably driven for a long time.

The disposition of the plurality of drive units 30 is not limited to the illustrated disposition. The "dispersion" described above includes not only that all of the plurality of drive units 30 are arranged separately but also that the plurality of drive units 30 are disposed in at least two groups.

In addition, as described above, the first drive board 531 for driving the first drive unit 31 is provided in the arm 11 (first arm) and the second drive board 532 for driving the second drive unit 32 is provided in the arm 12 (second arm).

With this configuration, the connection between the first drive board 531 and the first drive unit 31 and the connection between the second drive board 532 and the second drive unit 32 can be made in a simple configuration. Since heat generated from the first drive board 531 and the second drive board 532 can be dispersed, the robot 100 can be stably driven for a long time.

Furthermore, as described above, the plurality of drive boards 53 for independently driving the plurality of drive units 30, respectively, are provided in the robot arm 10.

Then, the plurality of drive boards 53 are dispersedly provided in the robot arm 10.

With this configuration, it is possible to simplify connection between the drive board 53 and the corresponding drive unit 30, for example, as compared with a configuration in which the plurality of drive units 30 are driven by one drive board 53. Since the plurality of drive boards 53 are dispersedly provided, heat generated from the drive board 53 can be dispersed and thus, the robot 100 can be stably driven for a long time.

In particular, as illustrated in the drawing, it is preferable that each drive board 53 is provided in the vicinity of the corresponding drive unit 30. With this configuration, it is possible to remarkably reduce the number of wirings of a power supply system and the number of wirings of a signal system, as compared with the case where the plurality of drive boards 53 are disposed collectively in the base 20.

The disposition of the plurality of drive boards 53 is not limited to the illustrated disposition. The "dispersion" described above includes not only that all of the plurality of drive boards 53 are disposed separately but also that the plurality of drive boards 53 are disposed in at least two groups.

Exterior Members and Sealing Members of Robot

Figure 8:
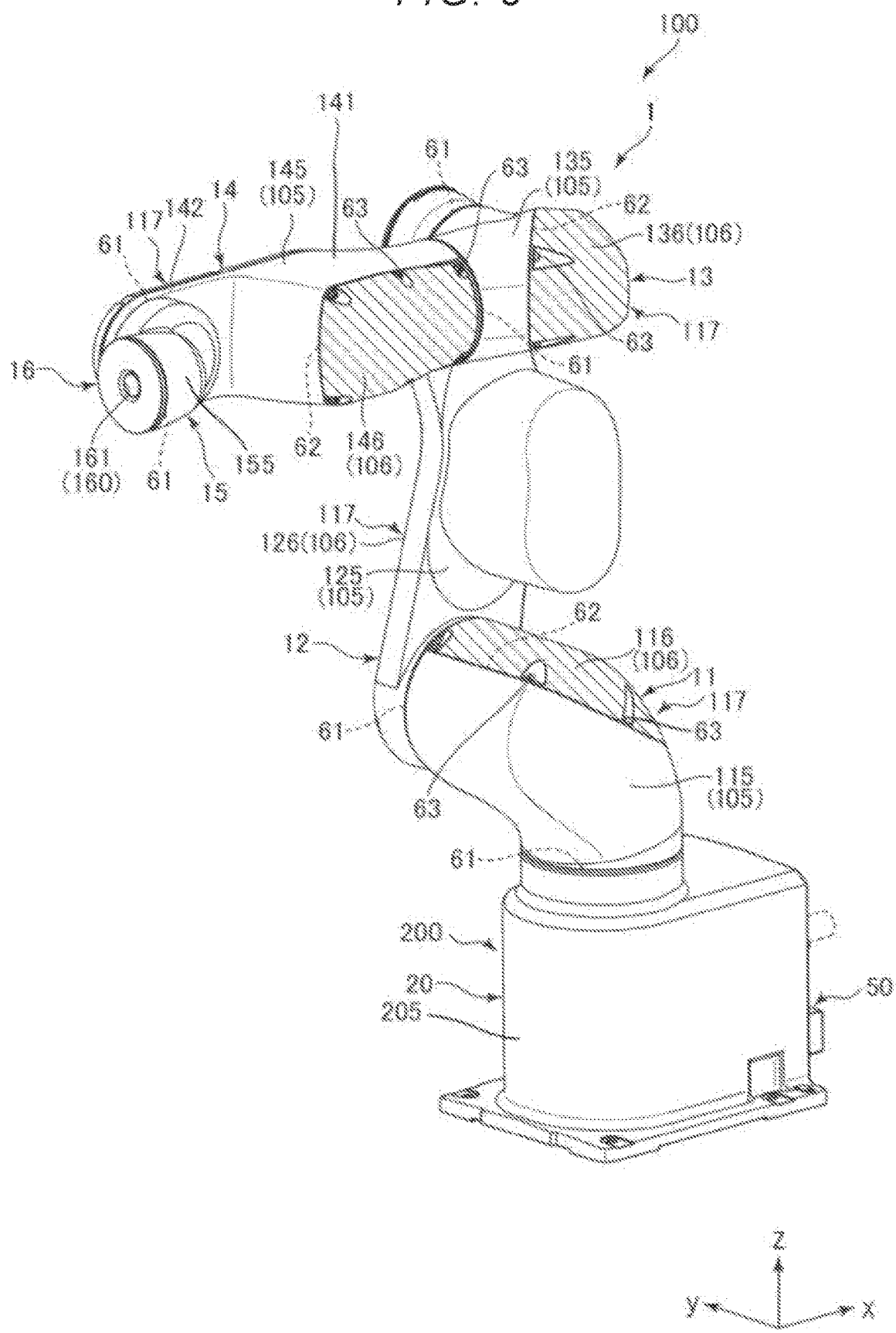
FIG. 8 is a diagram for explaining a plurality of housings and covers included in the robot.
Figure 9:
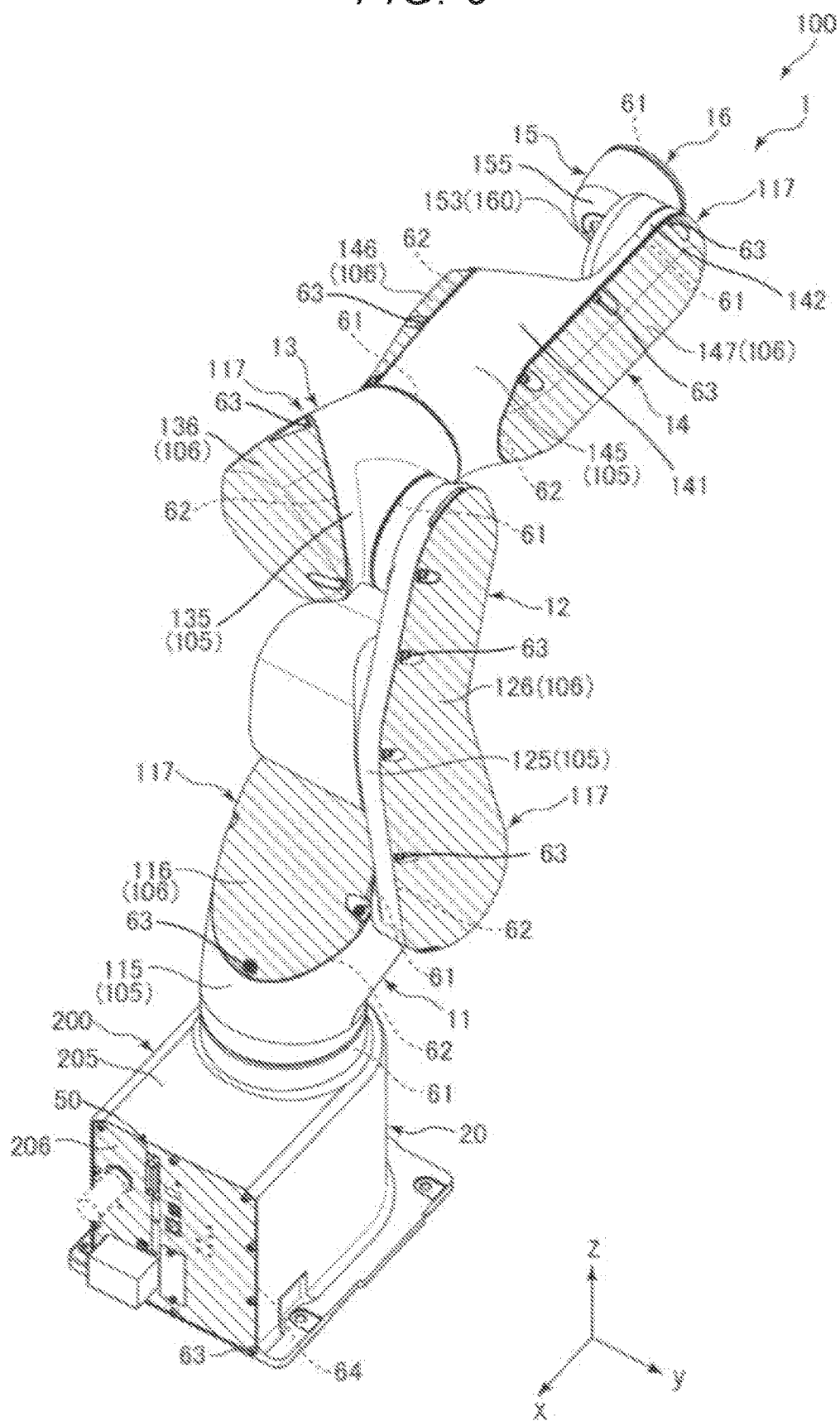
FIG. 9 is another diagram for explaining the plurality of housings and covers of the robot.

Each of FIGS. 8 and 9 is a diagram for explaining a plurality of housings and covers of the robot.

Next, exterior members (housings 205 and 105, the covers 106 and 206, and the like) and sealing members 61, 62, and 64 of the robot main body 1 will be described (see FIGS. 8 and 9).

The robot 100 is provided with the exterior member and the sealing members 61 and 62 described below and accordingly, the robot 100 can airtightly seal the interior (internal space S1) of the robot main body 1, so that waterproof performance and dustproof performance can be exhibited.

Exterior Member

As described above, the robot main body 1 is configured to include the plurality of exterior members (housings 205 and 105, covers 106 and 206, and the like). Specifically, as illustrated in FIGS. 8 and 9, the base 20 includes a first casing 200 including a housing 205 (member) and a cover 206 (member). Each of the arms 11 to 14 includes a second casing 117 including the housing 105 (member) and the cover 106 (member). More specifically, the second casing 117 of the arm 11 includes a housing 115 (member) and a cover 116 (member). The second casing 117 of the arm 12 includes a housing 125 (member) and a cover 126 (member). The second casing 117 of the arm 13 includes a housing 135 (member) and a cover 136 (member). The second casing 117 of the arm 14 includes a housing 145 (member), a cover 146 (member), and a cover 147 (member). The arm 15 includes a case 155. In the following description, when the housing 205, the housing 115, the housing 125, the housing 135, and the housing 145 are not distinguished from each other, these housings are referred to as the housing 105. Further, when the cover 206, the cover 116, the cover 126, the cover 136, the cover 146, and the cover 147 are not distinguished from each other, these covers are referred to as the cover 106.

The outer shape of the housing 205 of the base 20 is substantially rectangular parallelepiped. On the other hand, the outer shape of the cover 206 is a rectangular flat plate shape. The +x axis side and the +z axis side of the housing 205 are open, respectively, and the +x axis side opening of the housing 205 is closed by the cover 206. Specifically, the housing 205 and the cover 206 are connected via a sealing member 64 (first sealing member) and the cover 206 is screwed to the housing 205 by screws 63. With this configuration, the housing 205 and the cover 206 are fixedly connected.

The housing 115 of the arm 11 opens to the base end (−z axis side) thereof and the +z axis side and the +y axis side of the tip end portion thereof. The housing 115 is disposed in a state in which an edge portion forming the opening (−z axis side opening) of its base end portion is joined to an edge portion forming the +z− axis side opening of the housing 205. Specifically, a boundary portion between the housing 115 and the housing 205, that is, a joint portion (specifically, including various internal components and the like) between the arm 11 and the base 20 is connected via a sealing member 61 such as a packing, a metal ring, an oil seal or the like. With this configuration, the arm 11 is rotatably connected to the base 20. The +x axis side opening of the front end portion of the housing 115 is closed by the cover 116. Specifically, the housing 115 and the cover 116 are connected via a sealing member 62 (second sealing member), and the cover 116 is screwed to the housing 115 by the screws 63. With this configuration, the housing 115 and the cover 116 are fixedly connected to each other.

The housing 125 of the arm 12 is positioned on the −y axis side with respect to the cover 126, and mainly forms a portion on the −y axis side of the flat portion 121 and the protruding portion 122. On the other hand, the cover 126 is positioned on the +y axis side with respect to the housing 125, and mainly forms a portion on the +y axis side of the flat portion 121. The housing 125 opens to the −y axis side of the base end portion, the −y axis side of the tip end portion, and the whole area on the +y axis side. The housing 125 is disposed in a state in which an edge portion forming a −y axis side opening of the base end portion thereof is joined to an edge portion forming the +y axis side opening of the tip end portion of the housing 115. Specifically, the boundary portion between the housing 125 and the housing 115, that is, the joint portion between the arm 12 and the arm 11 is connected via the sealing member 61 such as a packing, a metal ring, an oil seal, or the like. With this configuration, the arm 12 is rotatably connected to the arm 11. Further, the +y axis side opening of the housing 125 is closed by the cover 126. Specifically, the housing 125 and the cover 126 are connected via a sealing member 62, and the cover 126 is screwed to the housing 125 by the screws 63. With this configuration, the housing 125 and the cover 126 are fixedly connected to each other.

The housing 135 opens to the base end portion (+y axis side), the tip end portion (−x axis side), and the +x axis side of the intermediate portion. The housing 135 is disposed in a state where an edge portion forming the opening (+y axis side opening) of the base end portion thereof is joined to an edge portion forming the −y axis side opening of the tip end portion of the housing 125. Specifically, the boundary portion between the housing 135 and the housing 125, that is, the joint portion between the arm 13 and the arm 12 is connected via the sealing member 61 such as a packing, a metal ring, an oil seal or the like. With this configuration, the arm 13 is rotatably connected to the arm 12. The +x axis side opening of the intermediate portion of the housing 135 is closed by the cover 136. Specifically, the housing 135 and the cover 136 are connected via the sealing member 62, and the cover 136 is screwed to the housing 135 by the screws 63. With this configuration, the housing 135 and the cover 136 are fixedly connected to each other.

The housing 145 forms most of the base end side portion 141 and most of the tip end side portion 142. On the other hand, the cover 146 forms the remaining portion of the base end side portion 141, and the cover 147 forms the remainder of the tip end side portion 142. Further, the housing 145 opens to the base end portion (+x axis side) thereof, the −y axis side in the base end side portion 141, and almost the whole area on the +y axis side. The housing 145 is disposed in a state in which an edge portion forming the opening (+x axis side opening) of the base end portion thereof is joined to an edge portion forming the tip end side opening (−x axis side opening) of the housing 135. Specifically, the boundary portion between the housing 145 and the housing 135, that is, the joint portion between the arm 14 and the arm 13 is connected via the sealing member 61 such as a packing, a metal ring, an oil seal or the like. With this configuration, the arm 14 is rotatably connected to the arm 13. Further, the −y axis side opening in the base end side portion 141 of the housing 145 is closed by the cover 146. Specifically, the housing 145 and the cover 146 are connected via the sealing member 62, and the cover 146 is screwed to the housing 145 by the screws 63. With this configuration, the housing 145 and the cover 146 are fixedly connected to each other. Similarly, the +y axis side opening of the housing 145 is closed by the cover 147. Specifically, the housing 145 and the cover 147 are connected via the sealing member 62, and the cover 147 is screwed to the housing 145 by the screws 63. With this configuration, the housing 145 and the cover 147 are fixedly connected to each other.

The case 155 forms the whole area of an exterior of the arm 15, and opens to the base end portion (+y axis side) thereof and the tip end portion (−x axis side) thereof. The case 155 is disposed in a state in which the edge portion forming the opening (+y axis side opening) of the base end portion thereof is joined to the edge portion forming the front end side opening (−y axis side opening) of the housing 145. Specifically, the boundary portion between the case 155 and the housing 145, that is, the joint portion between the arm 15 and the arm 14 is connected via the sealing member 61 such as a packing, a metal ring, an oil seal or the like. With this configuration, the arm 15 is rotatably connected to the arm 14. The disk-shaped arm 16 is rotatably connected to the edge portion which forms opening (−x axis side opening) of the tip end portion of the case 155 via the sealing member 61.

As such, the robot 100 includes the plurality of housings 105, the plurality of covers 106, the case 155, and the plurality of sealing members 61 and 62. With this configuration, it is possible to form the internal space S1 airtightly sealed. Specifically, for example, it is possible to exhibit waterproof performance and dustproof performance of IP67 grade conforming to the international electrotechnical commission (IEC) standard 60529.

Here, a disposition example of the sealing member 62 provided between the housing 105 and the cover 106 will be described.

Figure 10:
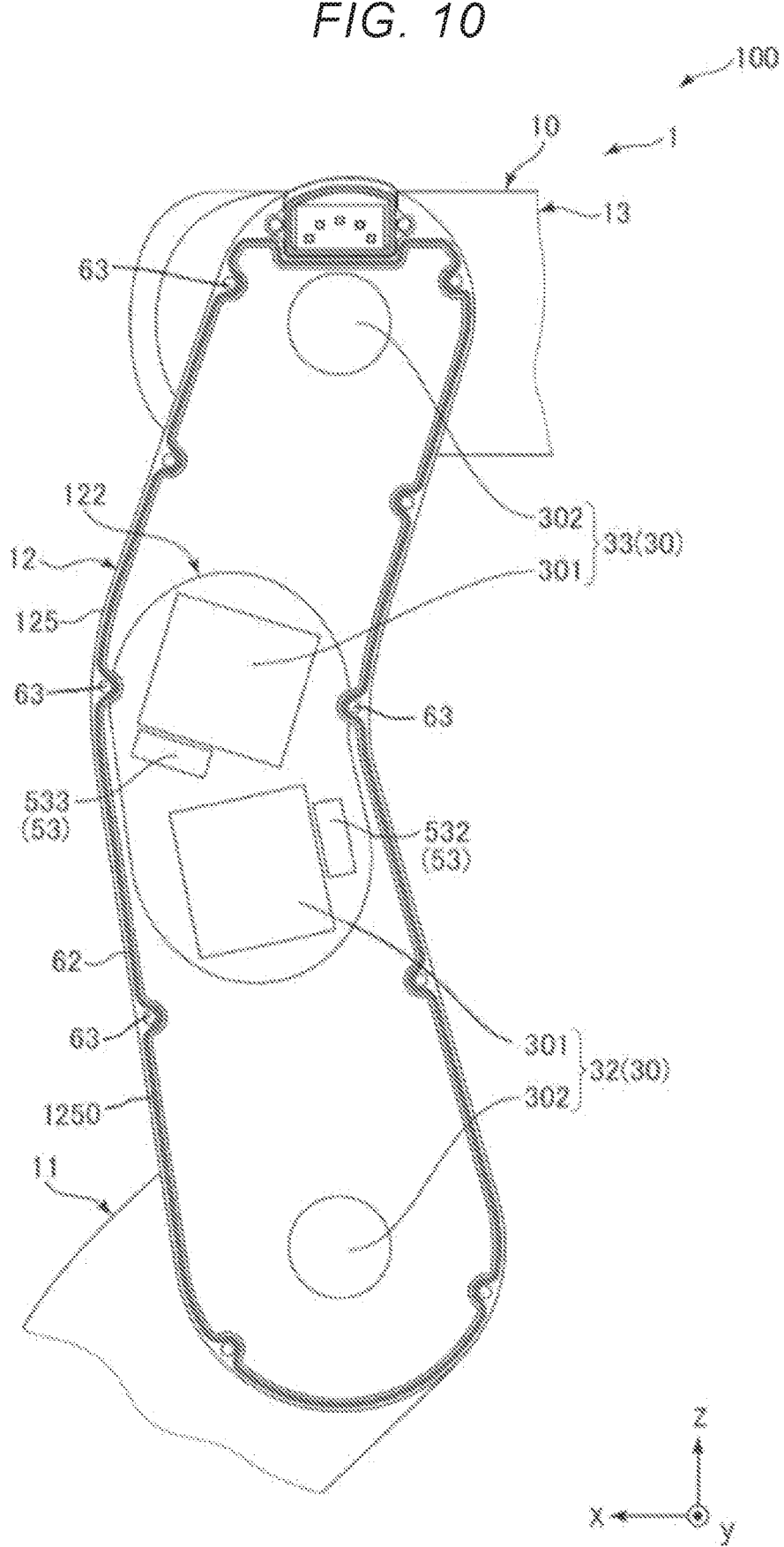
FIG. 10 is a diagram for explaining a sealing member included in the robot.

FIG. 10 is a diagram for explaining the sealing member included in the robot. In the following description, the sealing member 62 provided between the housing 125 and the cover 126 included in the arm 12 will be described as an example. FIG. 10 illustrates a diagram of the housing 125 as viewed from its +y axis side opening side with the cover 126 removed.

As illustrated in FIG. 10, the sealing member 62 is provided at an outer edge portion of the housing 125, more specifically, at an edge portion 1250 forming a +y axis side opening of the housing 125. The sealing member 62 is disposed so as to pass through the inside of the screws 63.

Also, the edge portion 1250 has a substantially flat surface. On the other hand, although not illustrated, a concave portion corresponding to the shape of the sealing member 62 is formed in a portion connected to the edge portion 1250 of the cover 126. Then, in a state where the sealing member 62 is disposed between the edge portion 1250 of the housing 125 and the recess of the cover 126, the cover 126 is fastened with a plurality of screws 63 while pressing the cover 126 against the housing 125, and as a result, the housing 125 and the cover 126 can be fixedly connected to each other.

Although not illustrated, disposition of the sealing member 62 provided between the other housing 105 and the cover 106 is the same as matters described above.

As such, the robot 100 includes the robot main body 1 that includes the base 20 including the first casing 200 and the robot arm 10 including the second casing 117 connected to the base 20 (plural in the embodiment), the drive unit 30 that is provided inside (internal space S1) the robot main body 1 and drives the robot arm 10 (plural in the embodiment), the control board 51 that is provided inside the robot main body 1, the power supply board 52 that supplies electric power to the control board 51, and the drive board 53 (plural in the embodiment) that drives the drive unit 30 based on a command from the control board 51 (see FIGS. 1, 6, 8 and 9). The first casing 200 is constituted with the housing 205 and the cover 206 (plurality of members), and the sealing member 64 (first sealing member) is provided between the housing 205 and the cover 206 (a plurality of members) of the first casing 200. The second casing 117 is constituted with the housing 105 and the cover 106 (plurality of members), and the sealing member 62 (second sealing member) is provided between the housing 105 and the cover 106 (a plurality of members) of the second casing 117.

In such a robot 100, since the internal space S1 accommodating the control board 51 and the power supply board 52 having the controller function and the drive board 53 is airtightly sealed, the robot 100 can be suitably used under an environment requiring waterproof performance or dustproof performance.

In the embodiment, the sealing member 61 is interposed between the housings 105, that is, the arms (including the base). For that reason, the internal space S1 can be more reliably sealed and thus, the robot 100 can exhibit excellent waterproof performance and dustproof performance.

In the embodiment, each of the arms 11 to 14 is configured to include the housing 105 (member) and the cover 106 (member), but the invention is not limited thereto. For example, all of the arms 11 to 16 may be configured to include the housing 105 (member) and the cover 106 (member), respectively, and at least one of the arms 11 to 16 may be configured to include the housing 105 (member) and the cover 106 (member). In the embodiment, the robot arm 10 is configured to include the plurality of housings 105 (members) and the plurality of covers 106 (members), but the invention is not limited thereto. For example, the robot arm 10 may be configured to include one housing 105 (member) and one cover 106 (member). For example, the housings 115, 125, 135, and 145 constituting the respective arms 11 to 14 may be integrated.

As the constituent material of the sealing members 62, 64, various types of resins (including elastomers), rubber, and the like are used. Instead of the sealing members 62 and 64, for example, an adhesive (sealing member) may be used.

As described above, the arm 12 is cantilevered by the arm 11, and the arm 15 is cantilevered by the arm 14. With this configuration, it is possible to reduce the installation places of the sealing member 61 as compared with the case where the arm 12 and the arm 14 are supported at both ends. For that reason, sealing performance of the robot main body 1 can be enhanced.

Furthermore, as described above, since the control board 51 and the power supply board 52 are provided in the base 20, the control board 51 and the power supply board 52 can be disposed apart from each other with respect to the plurality of drive units 30 and the plurality of drive boards 53 provided in the robot arm 10. For that reason, thermal runaway can be further reduced and thus, the robot 100 can be stably driven for a longer period of time under an environment requiring waterproof performance and the like.

As described above, since the plurality of drive units 30 and the plurality of drive boards 53 are dispersedly provided in the robot arm 10, respectively, thermal runaway can be reduced and thus, it is possible to drive the robot more stably for a longer period of time under an environment requiring waterproof performance and the like.

In particular, as described above, since the first drive unit 31 and the first drive board 531 are provided in the arm 11 instead of the base 20, the first drive unit 31 and the first drive board 531 can be separated from the control board 51 and the power supply board 52 provided in the base 20. For that reason, the effects described above can be exhibited particularly remarkably.

External Connection Portion

Figure 11:
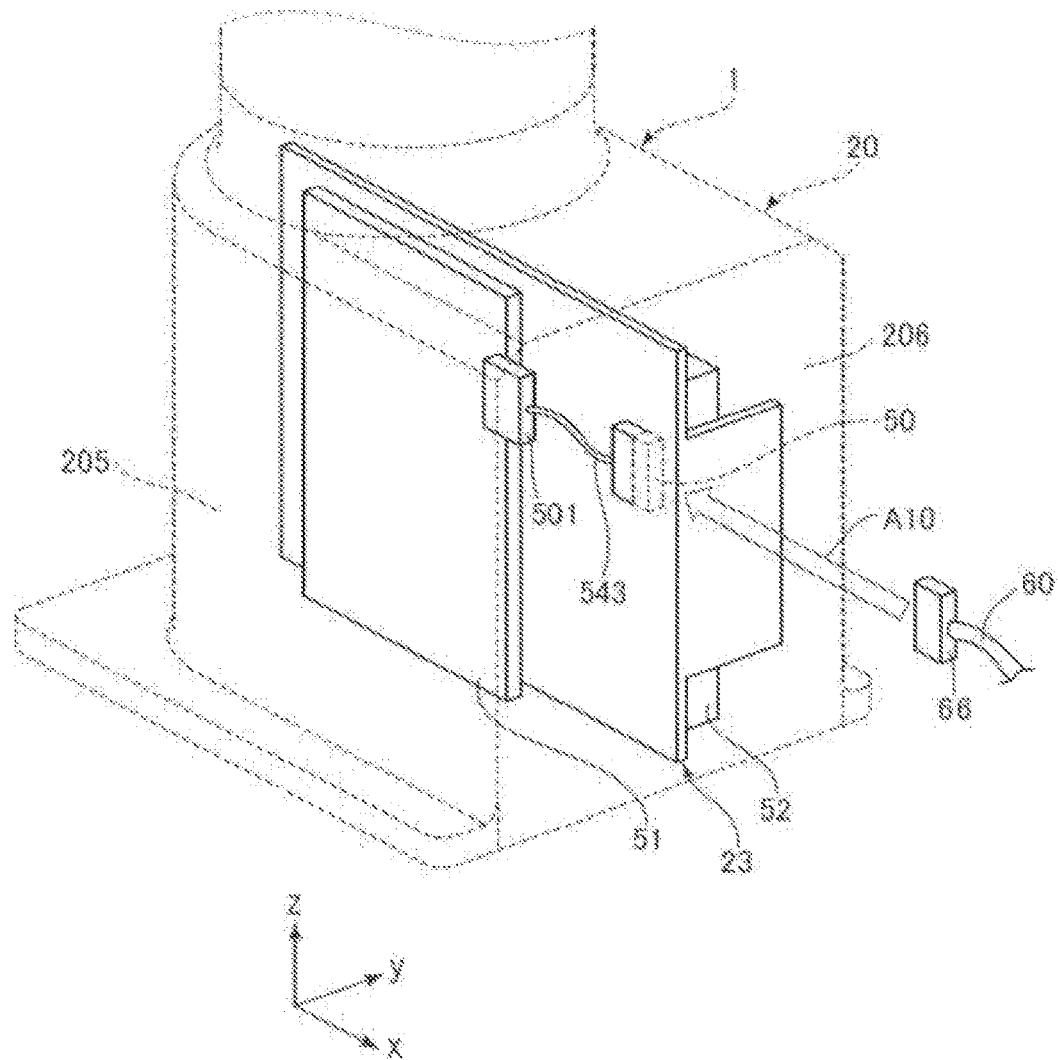
FIG. 11 is a perspective view schematically illustrating the inside of a base included in the robot.
Figure 12:
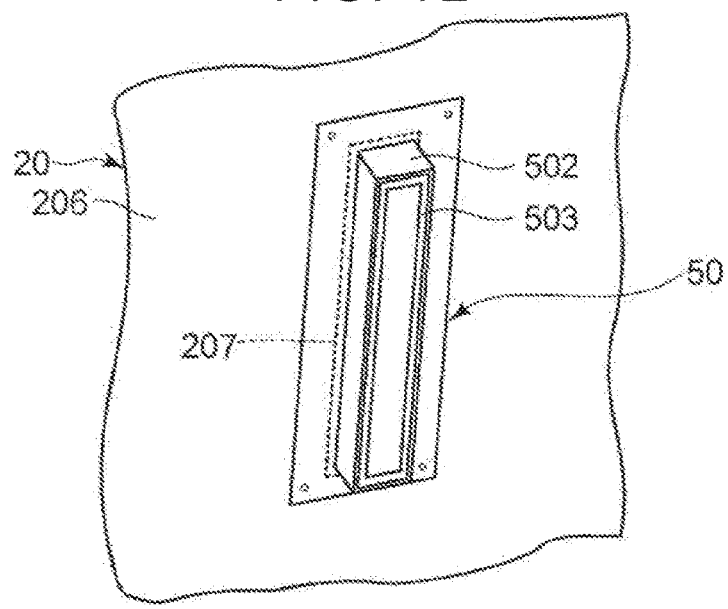
FIG. 12 is a diagram schematically illustrating an example of an external connection portion.
Figure 13:
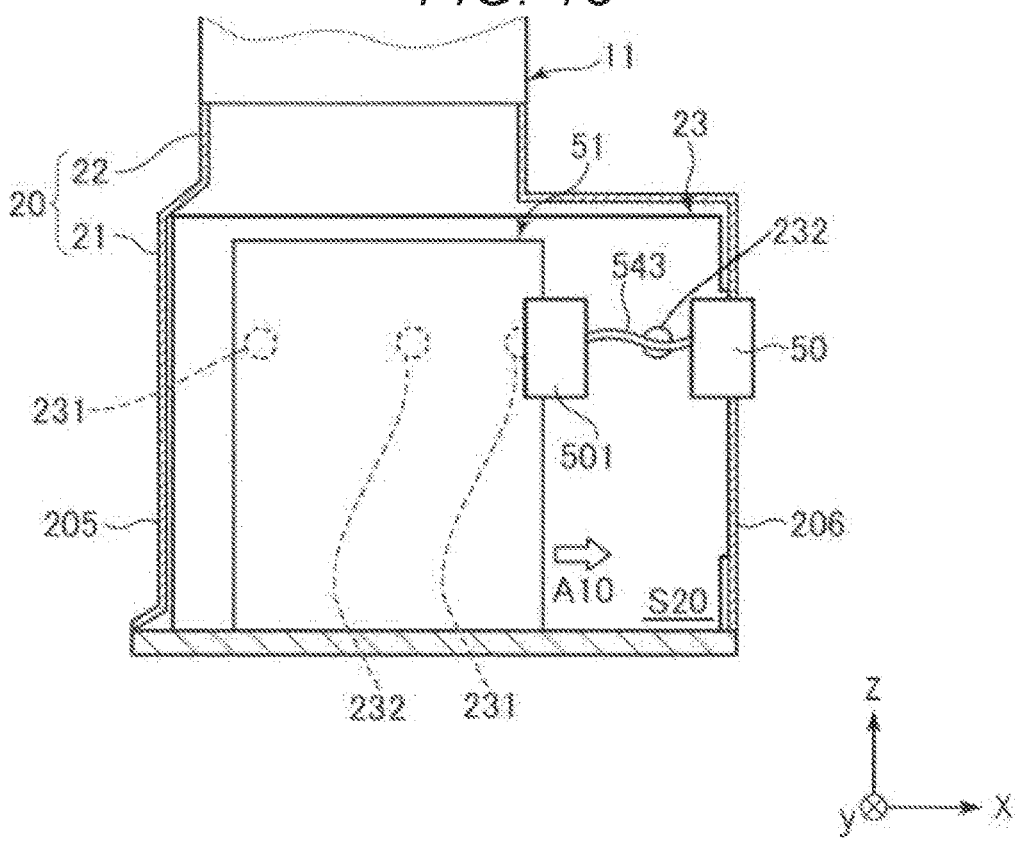
FIG. 13 is a diagram schematically illustrating a disposition of a control board included in the robot.
Figure 14:
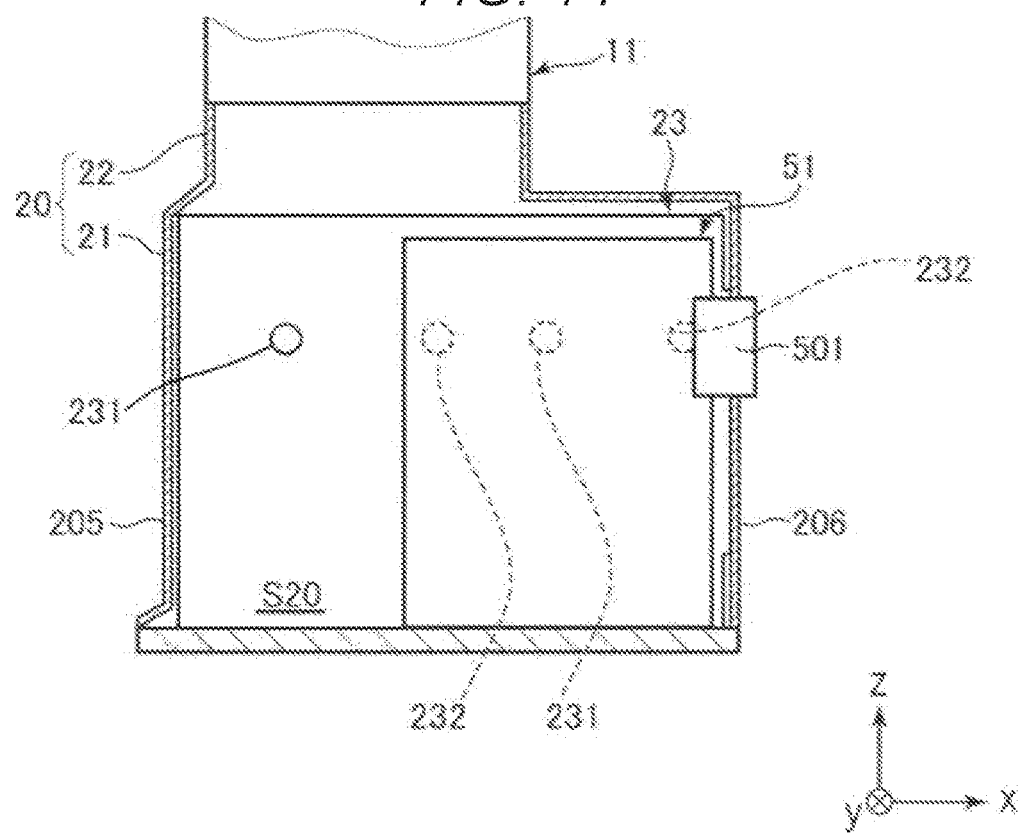
FIG. 14 is a diagram schematically illustrating a disposition of the control board different from that of FIG. 13.

FIG. 11 is a perspective view schematically illustrating the inside of a base included in the robot. FIG. 12 is a diagram schematically illustrating an example of an external connection portion. FIG. 13 is a diagram schematically illustrating a disposition of a control board included in the robot. FIG. 14 is a diagram schematically illustrating a disposition of the control board different from that of FIG. 13. In FIG. 11, one external connection portion 50 is illustrated as a representative.

Next, the external connection portion 50 (for example, a connector and the like) provided on the base 20 included in the robot main body 1 will be described (see FIG. 9). The robot 100 is provided with the external connection portion 50 described below so as to make it possible to more effectively exhibit waterproof performance and dustproof performance.

The cover 206 included in the base 20 is provided with the plurality of external connection portions 50 having waterproof properties and dust proof properties and constituted with, for example, a connector (see FIG. 9). The external connection portion 50 is a component for connecting an external cable 60 connected to, for example, an external power supply (not illustrated) or the like. That is, the external connection portion 50 is a component responsible for carrying out electrical connection between the external power supply or the like and the robot 100.

In the embodiment, the external connection portion 50 is connected to a connection portion 501 (a second connector) such as a connector or the like mounted on the control board 51 (specifically, a control circuit) via an internal wiring 543 (see FIG. 11), and is electrically connected to the control board 51 and further to the power supply board 52.

Further, the external connection portion 50 is provided such that a portion is exposed to the outside of the base 20 (see FIGS. 11 and 12). Specifically, the cover 206 is provided with a through-hole 207, and the external connection portion 50 is fixed to the cover 206 so as to close the through-hole 207 while inserting the external connection portion 50 into the through-hole 207.

The external connection portion 50 includes a terminal (not illustrated), a connector housing 502 forming a concave terminal accommodating chamber that accommodates the terminal, a packing 503 (third sealing member) provided on the inner periphery of the connector housing 502. Electric power can be supplied to the robot 100 and the robot 100 can be driven by connecting a plug 66 (connected portion) included in the external cable 60 to such an external connection portion 50. For example, the plug 66 illustrated in FIG. 11 may be moved in the direction of the arrow A10 and the plug 66 may be connected to the external connection portion 50.

Since the external connection portion 50 includes the packing 503, it is possible to connect the plug 66 in a state airtightly sealed to the external connection portion 50, by connecting the plug 66 to the external connection portion 50. With this configuration, it is possible to ensure waterproof property and dustproof property in the external connection portion 50. The external connection portion 50 is not limited to the configuration illustrated in the drawings and may have other configurations as long as the external connection portion 50 can exhibit waterproof property and dustproof property in a state where the plug 66 is connected, for example.

As a specific example of such an external connection portion 50, for example, a power supply connector for connecting an external power plug 66 electrically connected to an external power supply, a connector for inputting and outputting signals to and from various devices such as a teaching pendant used by a worker to give an operation instruction to the robot 100, a connector for outputting a signal to an end effector, and a connector for inputting and outputting data relating to a control program, and the like.

As such, the robot main body 1 (base 20 in the embodiment) is provided with the external connection portion 50 to which the external cable 60 (external wiring) is connected. Then, at least a portion (portion in the embodiment) of the external connection portion 50 is provided so as to be exposed to the outside of the robot main body 1 (e base 20 in the embodiment), has waterproof property and dustproof property.

With this configuration, the robot 100 can be suitably driven under an environment requiring waterproof performance, dustproof performance, and the like. In addition to the external cable 60 connected to an external power supply (not illustrated), the external cable 60 may be a wiring or the like electrically connected to an external device such as a teaching pendant or the like.

Matters that the external connection portion 50 has waterproof property and dustproof property mean that the external connection portion 50 has a configuration in which waterproof property and dustproof property can be exhibited in a state where the plug 66 (connected portion) is connected, for example. Although a specific degree of waterproof property and dustproof property is not particularly limited, it is particularly preferable that waterproof performance and dustproof performance of IP67 grade conforming to the international electrotechnical commission (IEC) standard 60529 can be exhibited.

The control board 51 and the power supply board 52 are respectively supported by the support member 23 made of sheet metal or the like. The control board 51 is attached to the −y axis side surface of the support member 23, and the power supply board 52 is attached to the +y axis side surface of the support member 23. Further, the support member 23 can be attached to and detached from the base 20. Accordingly, the control board 51 and the power supply board 52 can be taken out together with the support member 23 to the outside of the base 20. With this configuration, for example, maintenance of the control board 51 and the power supply board 52 can be easily performed.

The support member 23 is configured so that an attachment position on the surface on the −y axis side of the control board 51 can be changed. Specifically, the attachment position can be changed from a first position of the control board 51 illustrated in FIG. 13 to a second position of the control board 51 illustrated in FIG. 14. The reverse is also possible. More specifically, the support member 23 is provided with a plurality of screw holes 231 and 232 (attachment portions) for screwing the control board 51. By screwing the control board 51 using the screw holes 231, the control board 51 can be disposed at the first position as illustrated in FIG. 13. On the other hand, by screwing the control board 51 using the screw hole 232, the control board 51 can be disposed at the second position as illustrated in FIG. 14.

By positioning the control board 51 at the first position, a portion of the external connection portion 50 can be disposed so as to be exposed to the outside of the base 20. On the other hand, by positioning the control board 51 at the second position and detaching the external connection portion 50 and the internal wiring 543 from the connection portion 501, a portion of the connection portion 501 can be disposed so as to be exposed to the outside of the base 20, instead of the external connection portion 50.

As such, in the robot 100, the connection portion 501 that is disposed inside the robot main body 1 (base 20 in the embodiment) and is detachable from the external connection portion 50 and electrically connects the external connection portion 50 and the power supply board 52 is provided. The connection portion 501 can be detached from the external connection portion 50 and disposed in a state of being exposed to the outside of the robot main body 1 (base 20 in the embodiment) (see FIGS. 13 and 14). Then, an external cable 60 (external wiring) is connected to the connection portion 501, instead of the external connection portion 50. That is, the connection portion 501 is configured to be electrically connectable to the plug 66 (connected portion).

With this configuration, for example, it is possible to easily change the robot 100 that requires waterproof performance and the like to the robot 100 not requiring waterproof performance or the like. Also, the reverse is true. For that reason, it is possible to change the waterproof performance of the robot 100 according to the environmental conditions, which is highly convenient. Further, as long as the internal wiring 543 and the external connection portion 50 connectable to the connection portion 501 provided in the control board 51 included om the robot 100 which does not require the waterproof performance and the like are prepared, it can be said that it is possible to easily prepare the robot 100 that requires waterproof performance and the like.

The robot 100 according to the embodiment has been described as above. The robot 100 having the configuration as described above has a fan-less structure. That is, the robot main body 1 is not provided with a fan for generating airflow in the internal space S1.

With this configuration, it is possible to realize the robot 100 having excellent sealing performance. As described above, the power supply board 52 includes a converter (not illustrated) that converts power into a DC voltage of 20 V (relatively low drive voltage) and outputs the drive voltage to each drive board 53 or the like, thereby capable of realizing a fan-less structure.

Further, the robot 100 as described above can be suitably used under an environment of high cleanliness. The robot 100 can also be used particularly suitably under an environment of Class 3 or higher cleanliness class based on the International Unified Standard ISO 14644-1: 2015. In this case, for example, it is preferable to provide a member (for example, a heat exchanger) having a function of absorbing or radiating heat generated from the robot 100 to the robot 100.

Although the robot of the invention has been described as above based on the illustrated embodiment, the invention is not limited to thereto, and the configuration of each portion can be replaced with any configuration having the same function. Further, any other constituent element may be added to the invention.

In the embodiment described above, a single arm robot is exemplified as the robot of the invention, but the robot is not limited to the single arm robot, but may be another robot such as a dual arm robot, for example. That is, two or more robot arms may be provided to the base.

The entire disclosure of Japanese Patent Application No. 2017-192200, filed Sep. 29, 2017, is expressly incorporated by reference herein.

What is claimed is:

1. A robot comprising:
a robot main body that includes a base including a first casing and a robot arm connected to the base and including a second casing;
a motor that is provided inside the second casing and drives the robot arm;
a control board that is provided inside the first casing;
a power supply board that is provided inside the first casing and supplies electric power to the control board; and
a drive board that is provided inside the second casing and drives the motor based on a command from the control board,
wherein the first casing is constituted with a plurality of members, and a first sealing member is provided between the plurality of members of the first casing,
the second casing is constituted with a plurality of members, and a second sealing member is provided between the plurality of members of the second casing,
the robot main body is provided with a first connector to which an external wiring is connected,
the first connector is provided so as to be exposed to an outside of the robot main body, and the first connector includes a terminal, a connector housing in which the terminal is accommodated, and a third sealing member provided on an inner periphery of the connector housing,
the robot main body includes a second connector mounted on the control board and housed inside the robot main body, the second connector being detachable from the first connector and electrically connecting the first connector and the power supply board, and
the control board is configured to be moved from a first position to a second position, moving the second connector from a first position to a second position, and, in the second position, the second connector is disconnected from an external connection portion and exposed to the outside of the robot main body, the external wiring being connected to the second connector instead of the first connector.

2. The robot according to claim 1,
wherein the robot arm includes a first arm segment that is connected to the base and that rotates with respect to the base, and
a first arm segment motor that drives the first arm segment is provided in the first arm segment.

3. The robot according to claim 2,
wherein the robot arm includes a second arm segment that is connected to the first arm segment and that rotates with respect to the first arm segment, and
a second arm segment motor that drives the second arm segment is provided in the second arm segment.

4. The robot according to claim 3,
wherein a first arm segment drive board that drives the first arm segment motor is provided in the first arm segment, and
a second arm segment drive board that drives the second arm segment motor is provided in the second arm segment.

5. The robot according to claim 1,
wherein the robot arm includes an A-arm and a B-arm cantilevered by the A-arm.

6. The robot according to claim 1,
wherein a fan is not provided in the robot main body.

* * * * *